(12) United States Patent
Zhang et al.

(10) Patent No.: US 8,274,252 B2
(45) Date of Patent: Sep. 25, 2012

(54) MOTOR CONTROL APPARATUS

(75) Inventors: Wennong Zhang, Kitakyushu (JP); Hiroshi Nakamura, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 13/243,007

(22) Filed: Sep. 23, 2011

(65) Prior Publication Data

US 2012/0007541 A1   Jan. 12, 2012

Related U.S. Application Data

(63) Continuation of application No. PCT/JP2010/054658, filed on Mar. 18, 2010.

(30) Foreign Application Priority Data

Mar. 24, 2009   (JP) .................................. 2009-072655

(51) Int. Cl.
*G05B 6/02* (2006.01)

(52) U.S. Cl. ........ 318/621; 318/609; 318/632; 318/591; 318/568.22; 318/679; 700/29; 700/28; 700/44; 700/245; 703/2; 706/52; 369/43

(58) Field of Classification Search .................. 318/609, 318/632, 568.22, 621, 679, 568.2, 591; 703/2; 706/52; 369/43; 700/29, 44, 245, 28
See application file for complete search history.

(56) References Cited

U.S. PATENT DOCUMENTS

2004/0054440 A1*  3/2004  Zhang et al. ................. 700/245
2006/0015217 A1*  1/2006  Hagihara et al. ............. 700/250
2008/0036413 A1*  2/2008  Ohta et al. .................... 318/609
2008/0111514 A1*  5/2008  Ohta et al. .................... 318/609
2009/0143871 A1*  6/2009  Gao et al. ....................... 700/29

FOREIGN PATENT DOCUMENTS

| JP | 01-138662 | | 5/1989 |
| JP | 01138662 | A * | 5/1989 |
| JP | 04-021101 | | 1/1992 |
| JP | 04021101 | A * | 1/1992 |
| JP | 2002-237064 | | 8/2002 |
| JP | 2002237064 | A * | 8/2002 |
| JP | 2003-068035 | | 3/2003 |
| JP | 2003068035 | A * | 3/2003 |

OTHER PUBLICATIONS

International Search Report for International Application No. PCT/JP2010/054658, Apr. 13, 2010.

* cited by examiner

*Primary Examiner* — Walter Benson
*Assistant Examiner* — Jorge Carrasquillo
(74) *Attorney, Agent, or Firm* — Ditthavong Mori & Steiner, P.C.

(57) ABSTRACT

A motor control apparatus includes a sub-controller including a two-degree-of-freedom repetitive compensator and a shaping filter. The two-degree-of-freedom repetitive compensator includes a forward delay placed in a forward route of a loop and a feedback delay placed in a feedback route thereof and is configured so that a total delay time provided by the forward delay and the feedback delay is equal to the cycle of a target command or a disturbance. The shaping filter is configured so that the product of the pulse transfer function of the two-degree-of-freedom repetitive compensator and the complementary sensitivity function of a general-purpose control system has a low-pass characteristic.

10 Claims, 4 Drawing Sheets

MOTOR CONTROL APPARATUS

CROSS-REFERENCE TO RELATED APPLICATIONS

The present application is a continuation application of PCT/JP2010/054658, filed Mar. 18, 2010, which claims priority to Japanese Patent Application No. 2009-072655, filed Mar. 24, 2009. The contents of these applications are incorporated herein by reference in their entirety.

BACKGROUND OF THE INVENTION

1. Field of the Invention

The present invention relates to a motor control apparatus.

2. Discussion of the Background

As related art, for example, Japanese Unexamined Patent Application Publication No. 1-138662 discloses a control apparatus in which a low-pass filter is incorporated in a repetitive compensator in order to increase the stability of a control system, thus cutting high frequency components that cause a large phase delay in a delay and ensuring the stability of the control system.

SUMMARY OF THE INVENTION

According to one aspect of the present invention, a motor control apparatus includes a sub-controller configured to receive a first deviation, serving as the difference between a target command and a first control output from a control target, calculate a sub-compensation amount, and output the sub-compensation amount, a main controller configured to perform proportional control on the sum of the first deviation and the sub-compensation amount to obtain a first control command, perform proportional-integral control on a second deviation, serving as the difference between the first control command and a second control output from the control target, to obtain a second control command, and output the second control command to the control target, and a two-degree-of-freedom repetitive compensator including a positive feedback loop based on a total delay sampling number obtained by the sub-controller such that the cycle of the target command is divided by the control cycle of the sub-controller.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
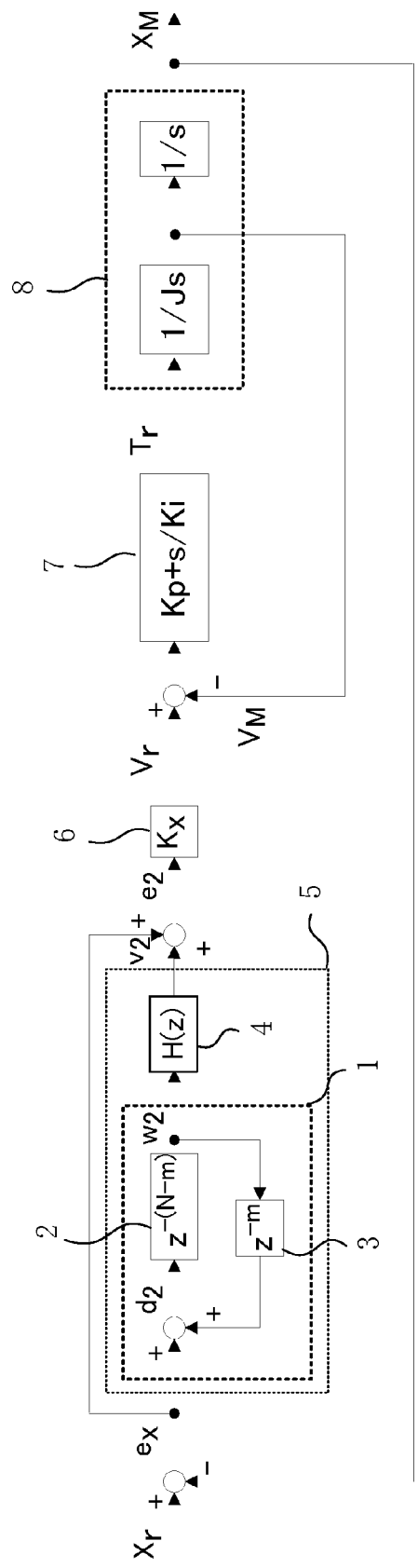
FIG. 1 is a block diagram of a motor control apparatus according to an embodiment of the present invention.

Embodiments will now be described with reference to the accompanying drawings, wherein like reference numerals designate corresponding or identical elements throughout the various drawings.

FIG. 1 is a block diagram of a motor control apparatus according to an embodiment of the present invention.

The motor control apparatus operates so as to receive a target command (position command $X_r$) from a higher-level apparatus (not illustrated), receive control outputs (a motor position $X_M$ and a motor velocity $V_M$) from a motor, serving as a control target (represented as a machine model 8), and a load in a feedback manner, and drive the control target.

The motor control apparatus includes a sub-controller 5 which receives a position deviation $e_x$, serving as the deviation between the position command $X_r$ and the motor position $X_M$, and outputs an amount of sub-compensation (hereinafter, referred to as the "sub-compensation amount") $v_2$, and a mechanism (main controller) which performs position proportional control on the sum of the position deviation $e_x$ and the sub-compensation amount $v_2$ to obtain a velocity command $V_r$ and performs velocity proportional-integral control on a velocity deviation, serving as the deviation between the velocity command $V_r$ and the motor velocity $V_M$, to obtain a torque command $T_r$ and drives the control target on the basis of the torque command $T_r$.

The main controller includes a position proportional (P) controller (hereinafter, referred to as the "P controller") 6 performing position proportional control and a velocity proportional-integral (PI) controller (hereinafter, referred to as the "PI controller") 7 performing velocity proportional-integral control.

The sub-controller 5 includes a two-degree-of-freedom repetitive compensator 1 and a shaping filter 4. The two-degree-of-freedom repetitive compensator 1 includes a positive feedback loop including a forward delay 2 in a forward route of the loop and a feedback delay 3 in a feedback route thereof, receives the position deviation $e_x$, and outputs an amount of repetitive compensation (hereinafter, "repetitive compensation amount") $w_2$.

The two-degree-of-freedom repetitive compensator 1 functions as the positive feedback loop including the forward delay 2 in the forward route of the loop and the feedback delay 3 in the feedback route thereof.

The shaping filter 4 is placed at an output stage of the two-degree-of-freedom repetitive compensator 1.

Figure 2:
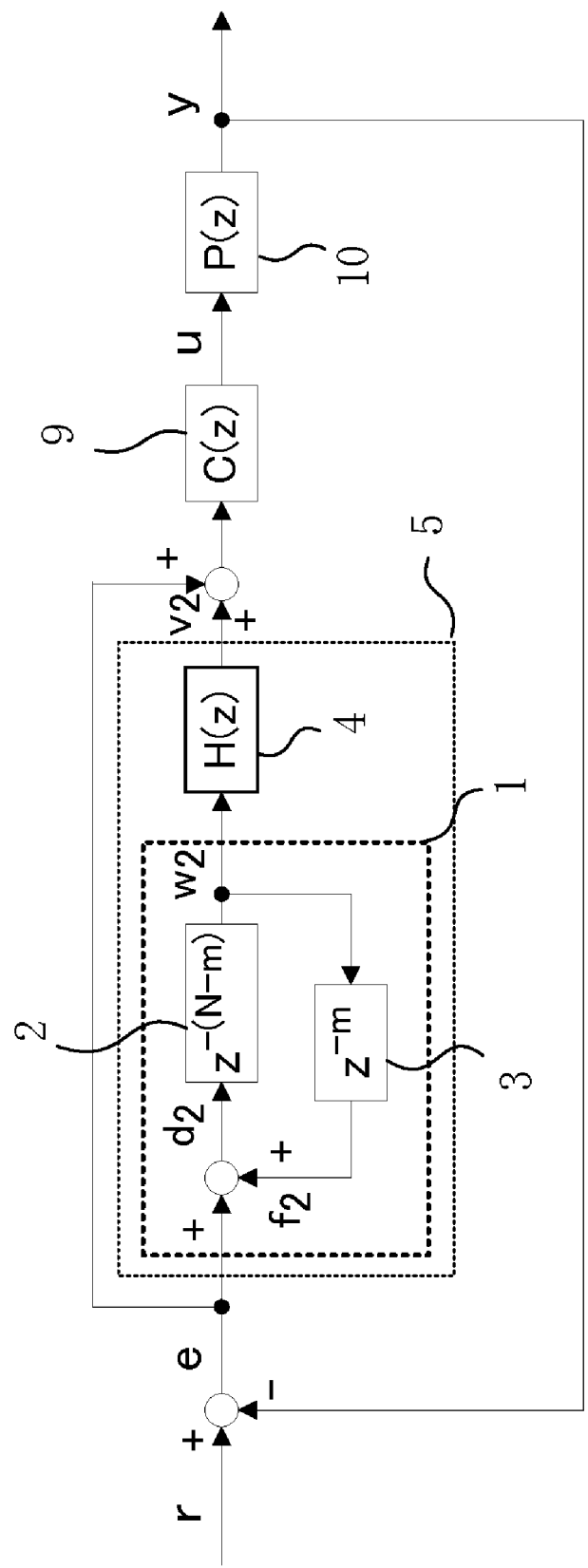
FIG. 2 is a block diagram explaining the operation principle of a sub-controller in the motor control apparatus according to the embodiment.

FIG. 2 is a block diagram explaining the operation principle of the sub-controller 5 in the motor control apparatus according to the present embodiment.

The motor control apparatus includes the sub-controller 5 and the main controller C(z), indicated at 9. The sub-controller 5 receives a deviation e, serving as the deviation between a target command r and a control output y, and outputs the sub-compensation amount $v_2$. The main controller C(z) 9 receives the sum of the deviation e and the sub-compensation amount $v_2$ and outputs a control command u. The motor control apparatus drives a control target P(z) 10.

The components designated by the same reference numerals as those in FIG. 1 have the same functional effects and detailed description thereof is omitted.

The main controller C(z) 9 corresponds to the P controller 6 and the PI controller 7 in FIG. 1. The control target P(z) 10 corresponds to the machine model 8. The target command r corresponds to the position command $X_r$. The control output y corresponds to the motor position $X_M$. The deviation e corresponds to the position deviation $e_x$.

The operation principle of the sub-controller 5 in the motor control apparatus according to the present embodiment will be described below.

First, the main controller C(z) 9 is determined so that a control system has a stabile constant command response characteristic. A complementary sensitivity function T(z) in this case is given by Equation (1) including the main controller C(z) 9 and the control target P(z) 10.

$$T(z) = \frac{P(z)C(z)}{1 + P(z)C(z)} \quad (1)$$

Subsequently, a parameter in the two-degree-of-freedom repetitive compensator 1 is determined.

When let $T_R$ be the cycle of the target command r and let $T_s$ denote the control cycle of the two-degree-of-freedom repetitive compensator 1, the total delay sampling number N of the two-degree-of-freedom repetitive compensator 1 is expressed by Equation (2).

$$N = T_R/T_s \quad (2)$$

When let the delay sampling number of the feedback delay 3 be m, m may be a natural number equal to or greater than the relative order, serving as the difference between the orders of the numerator and the denominator, (hereinafter, referred to as the "relative order of the numerator and denominator") of the complementary sensitivity function T(z). The delay sampling number of the forward delay 2 is expressed as (N−m).

A pulse transfer function $Q_2(z)$ from the deviation e between the target command r and the control output y to the repetitive compensation amount $w_2$, serving as an output of the two-degree-of-freedom repetitive compensator 1, is given by Equation (3).

$$Q_2(z) = \frac{w_2(z)}{e(z)} = \frac{z^{-(N-m)}}{1 - z^{-N}} \quad (3)$$

When $z = e^{j\omega T_s}$ is substituted into Equation (3) and the absolute values of both sides are obtained, Equation (4) is given.

$$|Q_2(e^{j\omega T_s})| = \left|\frac{e^{-j(N-m)\omega T_s}}{1 - e^{-jN\omega T_s}}\right| = \frac{1}{|1 - e^{-jN\omega T_s}|} \quad (4)$$

Assuming that $\omega = n\omega_0$ (n=0, 1, 2, . . . ) and $\omega_0 = 2\pi/T_R$, when $\omega$, $\omega_0$, and the total delay sampling number N of the two-degree-of-freedom repetitive compensator 1 expressed by Equation (2) are substituted into Equation (4), Equation (5) is given.

Equation (5) means that the two-degree-of-freedom repetitive compensator 1 functions as an internal model of the target command r having the cycle $T_R$.

$$|Q_2(e^{jn\omega_0 T_s})| = \frac{1}{|1 - e^{-jNn\omega_0 T_s}|} = \frac{1}{|1 - e^{-jn2\pi}|} = \infty \quad (5)$$

Finally, the shaping filter H(z)4 is designed so that the whole of the control system is stabilized.

A pulse transfer function $G_2(z)$ from the repetitive compensation amount $w_2$, serving as an output of the forward delay 2, to an input $d_2$ of the forward delay 2 is given by Equation (6) from the relationship with the complementary sensitivity function T(z) expressed by Equation (1).

$$G_2(z) = \frac{d_2(z)}{w_2(z)} = z^{-m} - H(z)T(z) \quad (6)$$

On the basis of the small-gain theorem, a condition for stability of the control system is obtained when the vector locus of $G_2(e^{j\omega T_s})$ in Equation (6) lies within a unit circle in a Nyquist diagram. In this case, a stability condition expressed by Equation (7) is satisfied.

$$|G_2(e^{j\omega T_s})| = |e^{-jm\omega T_s} - H(e^{j\omega T_s})T(e^{j\omega T_s})| < 1,\ 0 \leq \omega < 2\pi/T_s \quad (7)$$

It is assumed that Equation (8) is satisfied in order to meet the stability condition expressed by Equation (7). Note that $a_i$ and $b_i$ (i=1, 2, . . . , m) are complex constants each having an absolute value equal to or less than 1.

$$H(z)T(z) = \prod_{i=1}^{m} \frac{1 - b_i}{z - a_i} \quad (8)$$

When $b_i = a_i$, the right side of Equation (8) indicates a kind of low-pass filter. The smaller the absolute value of $a_i$, the higher the cut frequency of the filter.

Equation (9) is satisfied on the basis of Equations (8) and (7). Equation (9) means that $a_i$ and $b_i$ (i=1, 2, . . . , m) satisfying the stability condition expressed by Equation (7) absolutely exist in the vicinity of the origin of the Nyquist diagram.

$$\lim_{\forall a_i, b_i \to 0} |G_2(e^{j\omega T_s})| = \lim_{\forall a_i, b_i \to 0} \left|e^{-jm\omega T_s} - \prod_{i=1}^{m} \frac{1 - b_i}{e^{j\omega T_s} - a_i}\right| = 0 \quad (9)$$

When the main controller C(z) 9 is determined, the shaping filter H(z)4 is expressed by Equation (10) on the basis of Equation (8) because the complementary sensitivity function T(z) is expressed by Equation (1).

$$H(z) = \prod_{i=1}^{m} \frac{1 - b_i}{z - a_i} \bigg/ T(z) \quad (10)$$

As described above, the delay sampling number m of the feedback delay 3 is a natural number equal to or greater than the relative order of the numerator and denominator of the complementary sensitivity function T(z). Since the shaping filter H(z) 4 is proper on the basis of Equation (10), therefore, the motor control apparatus can be mounted.

A concrete mounted example of the motor control apparatus according to the present embodiment will now be described.

For example, it is assumed in FIG. 1 that the proportional gain $K_p$ of the PI controller 7 is 1257J (J denotes total inertia of a mechanical movable portion) and the integral gain $K_i$ is 392700J, and the proportional gain $K_x$ of the P controller 6 is 200. When the repetitive control cycle $T_s$ of the two-degree-of-freedom repetitive compensator 1 is 2 ms, the complementary sensitivity function T(z) in the case where the sub-controller 5 does not exist is expressed by Equation (11) from the relationship with Equation (1).

$$T(z) = \frac{0.2661z^2 - 0.002982z - 0.07413}{z^3 - 1.173z^2 + 0.44340.003z - 0.081} \quad (11)$$

In Equation (11), since the relative order of the numerator and denominator of the complementary sensitivity function T(z) is 1, the delay sampling number m of the feedback delay 3 is set to 2.

When the cycle $T_R$ of the position command $X_r$ is, for example, 6 s, the total delay sampling number N of the two-degree-of-freedom repetitive compensator 1 is 3000 on the basis of Equation (2).

When the complex constants $a_i$ and $b_i$ (i=1, 2) are set such that $a_1 = b_1 = 0.3679$ and $a_2 = b_2 = -0.3679$ in order to meet the stability condition expressed by Equation (7), a pulse transfer function $G_2(z)$ from the output $w_2$ of the forward delay 2 to the input $d_2$ of the forward delay 2 is expressed by Equation (12) on the basis of Equations (6) and (8).

$$G_2(z) = z^{-2} \cdot \frac{1 - 0.1354}{z^2 - 0.1354} \quad (12)$$

Figure 3:
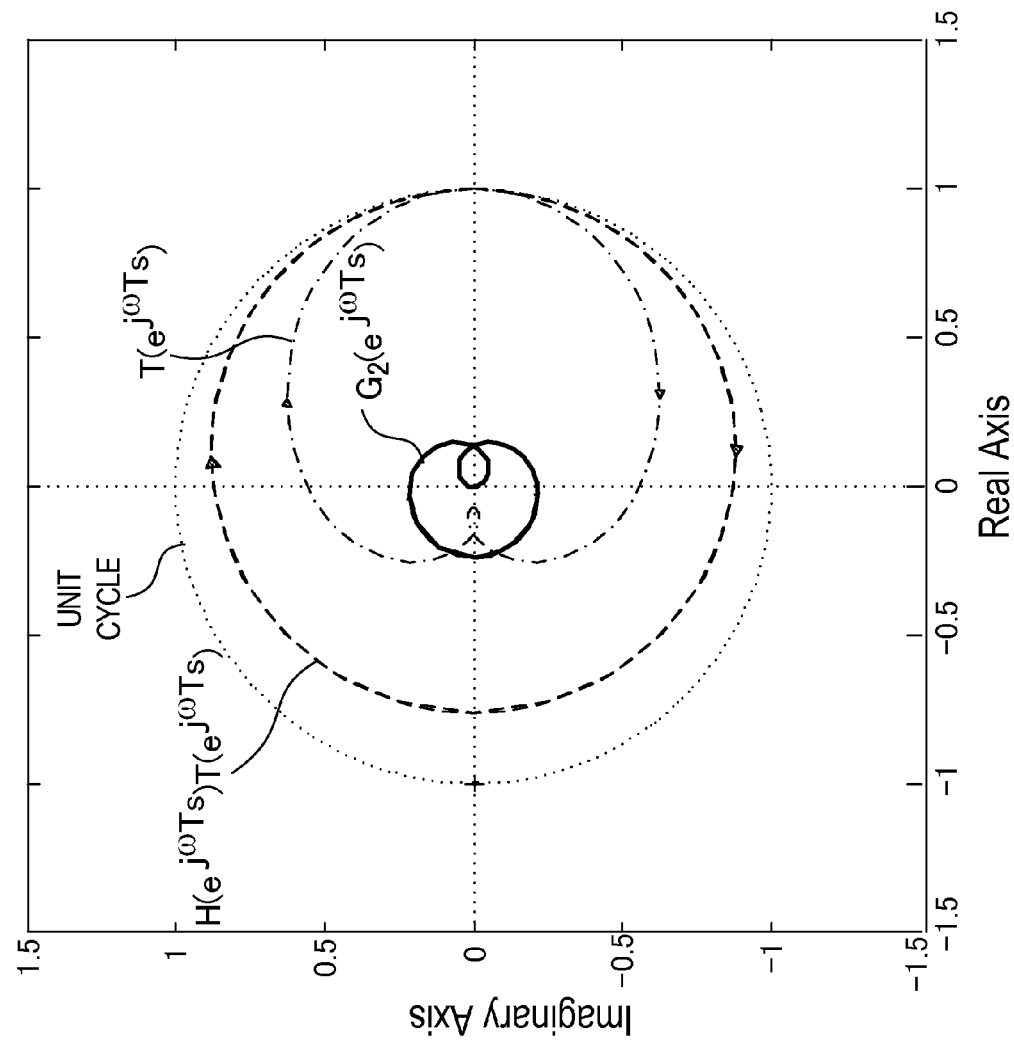
FIG. 3 is a diagram illustrating vector loci of a control system in the motor control apparatus according to the embodiment.

FIG. 3 is a diagram illustrating vector loci of the control system in the motor control apparatus according to the present embodiment. Referring to FIG. 3, the vector locus of $G_2(e^{j\omega Ts})$ lies within a unit circle in a Nyquist diagram and is also in the vicinity of the center of the unit circle. Accordingly, this means that this control system is stable and the stability margin is large.

Figure 4:
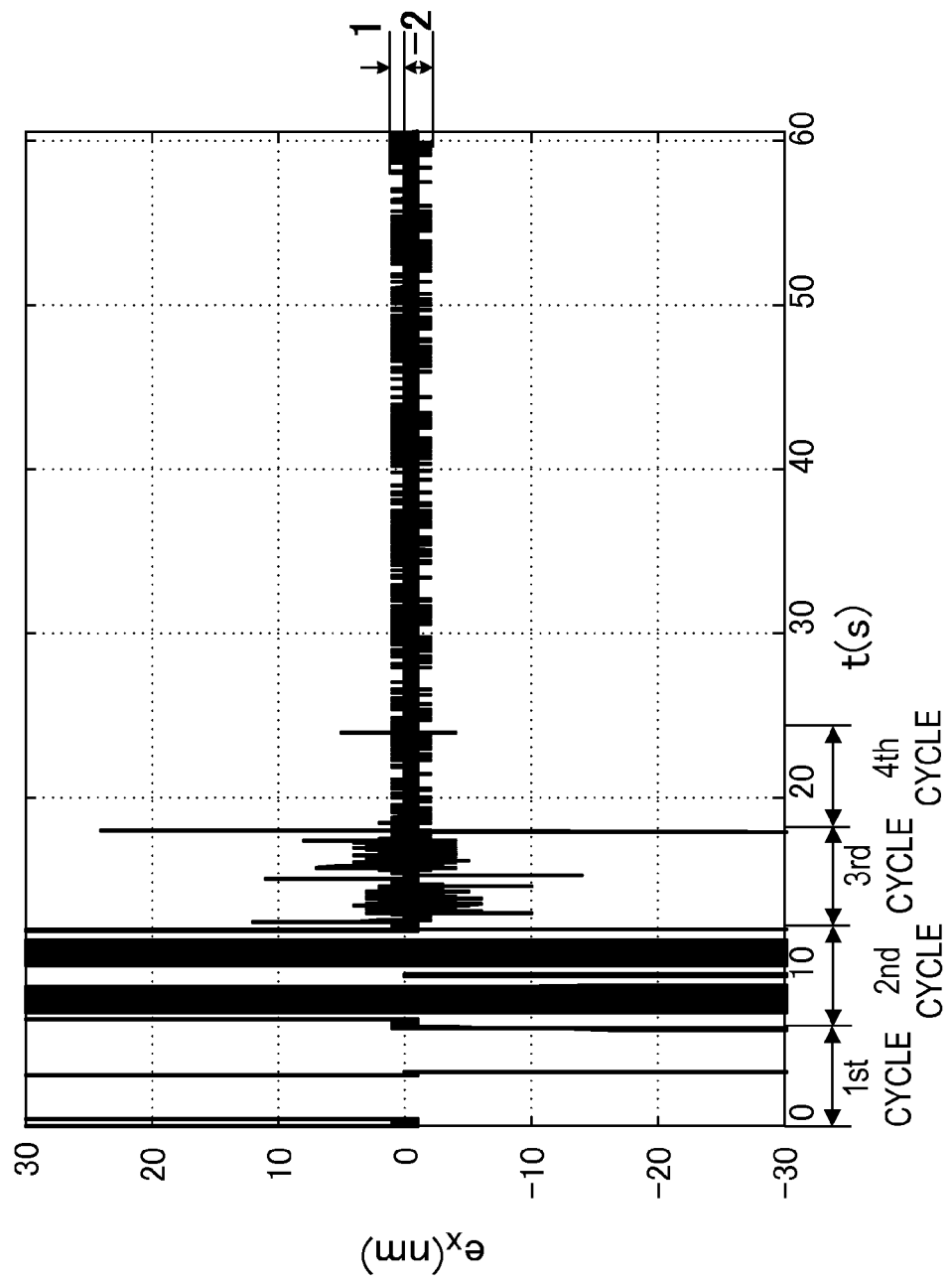
FIG. 4 is a diagram illustrating a simulation of a position deviation waveform in the motor control apparatus according to the embodiment.

FIG. 4 is a diagram illustrating a simulation of a position deviation waveform in the motor control apparatus according to the present embodiment. The resolution of a position sensor was set to 1 nm/pulse. In FIG. 4, the position deviation $e_x$ was 2 nm or less after the fifth cycle (steady state).

It is clear from FIGS. 3 and 4 that the motor control apparatus according to the present embodiment provides good stability and excellent command following capability.

In the motor control apparatus according to the present embodiment, the total delay time $NT_S$ of one cycle through the loop of the two-degree-of-freedom repetitive compensator is set to be equal to the cycle of a periodic disturbance, so that the two-degree-of-freedom repetitive compensator functions as an internal model of the disturbance. This effectively suppresses adverse effects of the disturbance and also stably suppresses the periodic disturbance effectively.

As described above, the motor control apparatus according to the present embodiment can allow the closed loop of the control system to have an inner model of a periodic signal and ensure the stability of the control system.

Furthermore, the motor control apparatus according to the present embodiment can provide effective following capability for a periodic target command or effective suppressing capability for a period disturbance.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A motor control apparatus comprising:
   a sub-controller configured to receive a first deviation, serving as the difference between a target command and a first control output from a control target, calculate a sub-compensation amount, and output the sub-compensation amount;
   a main controller configured to perform proportional control on the sum of the first deviation and the sub-compensation amount to obtain a first control command, perform proportional-integral control on a second deviation, serving as the difference between the first control command and a second control output from the control target, to obtain a second control command, and output the second control command to the control target; and
   a two-degree-of-freedom repetitive compensator including a positive feedback loop based on a total delay sampling number obtained by the sub-controller such that the cycle of the target command is divided by the control cycle of the sub-controller,
   wherein the two-degree-of-freedom repetitive compensator includes a forward delay placed in a forward route of the positive feedback loop and a feedback delay placed in a feedback route thereof and receives the first deviation and calculates and outputs a repetitive compensation amount.

2. The apparatus according to claim 1, wherein the two-degree-of-freedom repetitive compensator is an internal model of the target command, the model having the cycle of the target command.

3. The apparatus according to claim 1, wherein the delay sampling number of the feedback delay is a natural number equal to or greater than the relative order of the numerator and denominator of a complementary sensitivity function.

4. The apparatus according to claim 1, wherein the delay sampling number of the forward delay is the difference between the total delay sampling number and the delay sampling number of the feedback delay.

5. The apparatus according to claim 1, wherein a predetermined variable is determined so that the vector locus of a pulse transfer function from the repetitive compensation amount, serving as an output of the forward delay, to an input of the forward delay lies within a unit circle in a Nyquist diagram.

6. A motor control apparatus comprising:
   a sub-controller configured to receive a position deviation, serving as the difference between a position command and a motor position from a control target, calculate a sub-compensation amount, and output the sub-compensation amount;
   a main controller configured to perform position proportional control on the sum of the position deviation and the sub-compensation amount to obtain a velocity command, perform velocity proportional-integral control on a velocity deviation, serving as the difference between the velocity command and a motor velocity from the control target, to obtain a torque command, and output the torque command to the control target; and
   a two-degree-of-freedom repetitive compensator including a positive feedback loop based on a total delay sampling number obtained by the sub-controller such that the cycle of the position command is divided by the control cycle of the sub-controller,
   wherein the two-degree-of-freedom repetitive compensator includes a forward delay placed in a forward route of the positive feedback loop and a feedback delay placed in a feedback route thereof and receives the position deviation and calculates and outputs a repetitive compensation amount.

7. The apparatus according to claim 6, wherein the two-degree-of-freedom repetitive compensator is an internal model of the position command, the model having the cycle of the position command.

8. The apparatus according to claim 6, wherein the delay sampling number of the feedback delay is a natural number equal to or greater than the relative order of the numerator and denominator of a complementary sensitivity function.

9. The apparatus according to claim 6, wherein the delay sampling number of the forward delay is the difference between the total delay sampling number and the delay sampling number of the feedback delay.

10. The apparatus according to claim 6, wherein a predetermined variable is determined so that the vector locus of a pulse transfer function from the repetitive compensation amount, serving as an output of the forward delay, to an input of the forward delay lies within a unit circle in a Nyquist diagram.

* * * * *